US012688100B1

(12) United States Patent　　　　(10) Patent No.:　　US 12,688,100 B1
Kaushik et al.　　　　　　　　　　　(45) Date of Patent:　　　　Jul. 21, 2026

(54) FAST RECOVERY OF SYNCHRONOUS REPLICATION TO MINIMIZE DISRUPTION IN A CROSS-SITE DISTRIBUTED STORAGE SYSTEM

(71) Applicant: NetApp, Inc., San Jose, CA (US)

(72) Inventors: Akhil Kaushik, San Jose, CA (US); Anoop Vijayan, Bangalore (IN); Sohan Shetty, Bangalore (IN); Preetham Kudgi Shenoy, Bangalore (IN); Krishna Murthy Chandraiah Setty Narasingarayanapeta, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/034,425

(22) Filed: Jan. 22, 2025

(51) Int. Cl.
　　*G06F 11/00*　　　(2006.01)
　　*G06F 11/1446*　　(2026.01)
　　*G06F 11/20*　　　(2006.01)

(52) U.S. Cl.
　　CPC ...... *G06F 11/2076* (2013.01); *G06F 11/1451* (2013.01); *G06F 11/2023* (2013.01)

(58) Field of Classification Search
　　CPC ............. G06F 11/2076; G06F 11/1451; G06F 11/2023
　　See application file for complete search history.

(56) References Cited

U.S. PATENT DOCUMENTS

| | | | |
|---|---|---|---|
| 2002/0129214 A1* | 9/2002 | Sarkar ................. | G06F 11/2069 711/112 |
| 2015/0019909 A1* | 1/2015 | Griffith ............... | G06F 11/1662 714/15 |
| 2018/0246928 A1* | 8/2018 | Kim .................... | G06F 16/2358 |

* cited by examiner

*Primary Examiner* — Jason B Bryan

(74) *Attorney, Agent, or Firm* — Jaffery Watson Hamilton & DeSanctis LLP

(57) ABSTRACT

OP logs are utilized for fast recovery of synchronous replication in a storage system. According to one embodiment, a computer-implemented method comprises establishing synchronous replication between one or more storage objects of a first consistency group (CG1) of a primary storage site and one or more storage objects of a second consistency group (CG2) of a secondary storage site, initiating a peer health check to determine a health condition of the primary storage site and concurrently initiating a create snapshot process to create a snapshot of one or more storage objects of the CG2 of the secondary storage site in response to detection of missing heartbeat communications from the primary storage site, and performing inflight tracking replay and reconciliation between a first Op log of the primary storage site and a second Op log of the secondary storage site when an out of sync state or failover occurs.

20 Claims, 13 Drawing Sheets

300 —

Figure 8A:
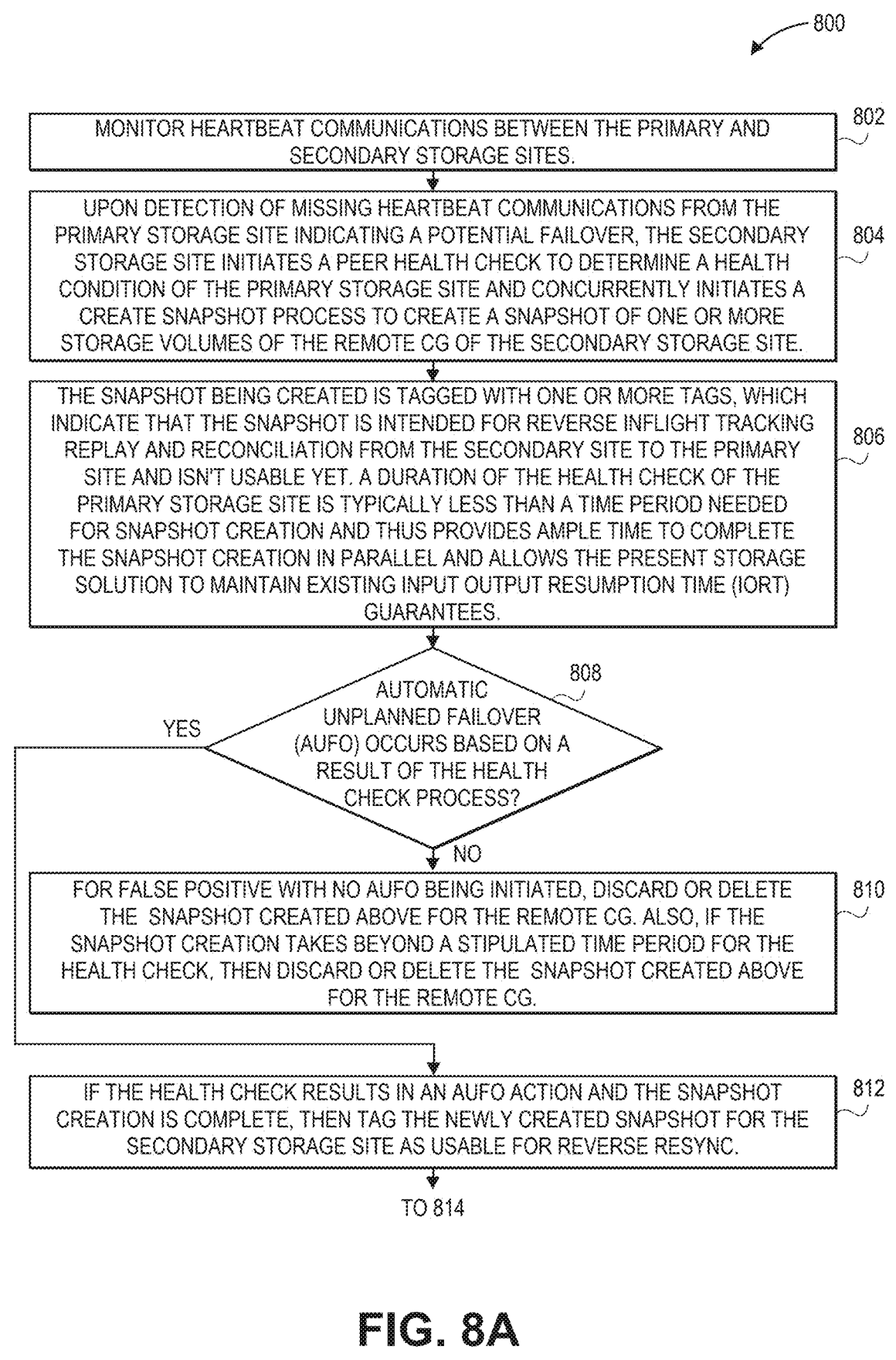

800

| MONITOR HEARTBEAT COMMUNICATIONS BETWEEN THE PRIMARY AND SECONDARY STORAGE SITES. | 802 |

| UPON DETECTION OF MISSING HEARTBEAT COMMUNICATIONS FROM THE PRIMARY STORAGE SITE INDICATING A POTENTIAL FAILOVER, THE SECONDARY STORAGE SITE INITIATES A PEER HEALTH CHECK TO DETERMINE A HEALTH CONDITION OF THE PRIMARY STORAGE SITE AND CONCURRENTLY INITIATES A CREATE SNAPSHOT PROCESS TO CREATE A SNAPSHOT OF ONE OR MORE STORAGE VOLUMES OF THE REMOTE CG OF THE SECONDARY STORAGE SITE. | 804 |

| THE SNAPSHOT BEING CREATED IS TAGGED WITH ONE OR MORE TAGS, WHICH INDICATE THAT THE SNAPSHOT IS INTENDED FOR REVERSE INFLIGHT TRACKING REPLAY AND RECONCILIATION FROM THE SECONDARY SITE TO THE PRIMARY SITE AND ISN'T USABLE YET. A DURATION OF THE HEALTH CHECK OF THE PRIMARY STORAGE SITE IS TYPICALLY LESS THAN A TIME PERIOD NEEDED FOR SNAPSHOT CREATION AND THUS PROVIDES AMPLE TIME TO COMPLETE THE SNAPSHOT CREATION IN PARALLEL AND ALLOWS THE PRESENT STORAGE SOLUTION TO MAINTAIN EXISTING INPUT OUTPUT RESUMPTION TIME (IORT) GUARANTEES. | 806 |

AUTOMATIC UNPLANNED FAILOVER (AUFO) OCCURS BASED ON A RESULT OF THE HEALTH CHECK PROCESS? 808

YES

NO

| FOR FALSE POSITIVE WITH NO AUFO BEING INITIATED, DISCARD OR DELETE THE SNAPSHOT CREATED ABOVE FOR THE REMOTE CG. ALSO, IF THE SNAPSHOT CREATION TAKES BEYOND A STIPULATED TIME PERIOD FOR THE HEALTH CHECK, THEN DISCARD OR DELETE THE SNAPSHOT CREATED ABOVE FOR THE REMOTE CG. | 810 |

| IF THE HEALTH CHECK RESULTS IN AN AUFO ACTION AND THE SNAPSHOT CREATION IS COMPLETE, THEN TAG THE NEWLY CREATED SNAPSHOT FOR THE SECONDARY STORAGE SITE AS USABLE FOR REVERSE RESYNC. | 812 |

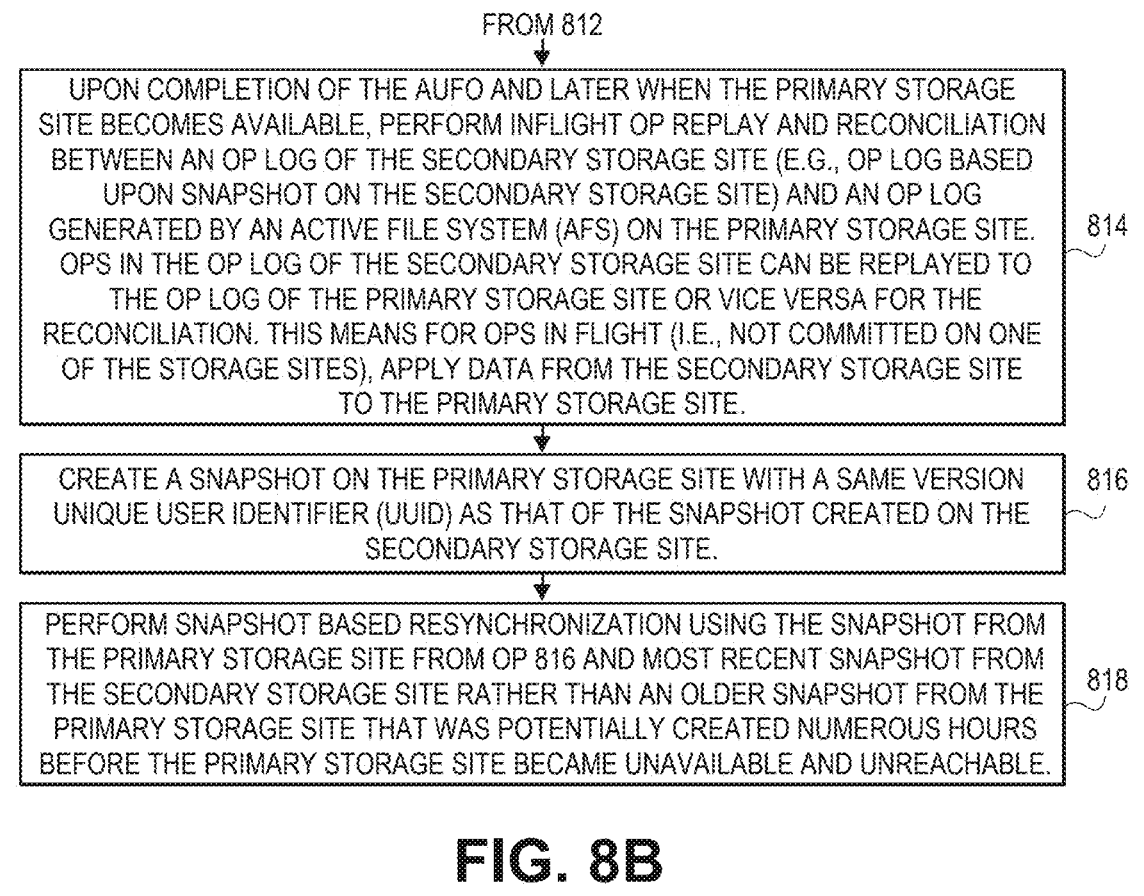

FROM 812

UPON COMPLETION OF THE AUFO AND LATER WHEN THE PRIMARY STORAGE SITE BECOMES AVAILABLE, PERFORM INFLIGHT OP REPLAY AND RECONCILIATION BETWEEN AN OP LOG OF THE SECONDARY STORAGE SITE (E.G., OP LOG BASED UPON SNAPSHOT ON THE SECONDARY STORAGE SITE) AND AN OP LOG GENERATED BY AN ACTIVE FILE SYSTEM (AFS) ON THE PRIMARY STORAGE SITE. OPS IN THE OP LOG OF THE SECONDARY STORAGE SITE CAN BE REPLAYED TO THE OP LOG OF THE PRIMARY STORAGE SITE OR VICE VERSA FOR THE RECONCILIATION. THIS MEANS FOR OPS IN FLIGHT (I.E., NOT COMMITTED ON ONE OF THE STORAGE SITES), APPLY DATA FROM THE SECONDARY STORAGE SITE TO THE PRIMARY STORAGE SITE. — 814

CREATE A SNAPSHOT ON THE PRIMARY STORAGE SITE WITH A SAME VERSION UNIQUE USER IDENTIFIER (UUID) AS THAT OF THE SNAPSHOT CREATED ON THE SECONDARY STORAGE SITE. — 816

PERFORM SNAPSHOT BASED RESYNCHRONIZATION USING THE SNAPSHOT FROM THE PRIMARY STORAGE SITE FROM OP 816 AND MOST RECENT SNAPSHOT FROM THE SECONDARY STORAGE SITE RATHER THAN AN OLDER SNAPSHOT FROM THE PRIMARY STORAGE SITE THAT WAS POTENTIALLY CREATED NUMEROUS HOURS BEFORE THE PRIMARY STORAGE SITE BECAME UNAVAILABLE AND UNREACHABLE. — 818

FIG. 8B

FAST RECOVERY OF SYNCHRONOUS REPLICATION TO MINIMIZE DISRUPTION IN A CROSS-SITE DISTRIBUTED STORAGE SYSTEM

COPYRIGHT NOTICE

CROSS-REFERENCE TO RELATED APPLICATIONS

Not applicable.

FIELD

Various embodiments of the present disclosure generally relate to multi-site distributed data storage systems. In particular, some embodiments relate to usage of operation (OP) logs for fast recovery of synchronous replication to minimize disruption due to a failure event or network partition in a dual copy data storage system.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for usage of operation (OP) logs for fast recovery of synchronous replication to minimize disruption due to a failure event or network partition in a dual copy data storage system. According to one embodiment, a computer-implemented method performed by one or more processing resources of a distributed storage system comprises establishing synchronous replication between one or more storage objects of a first consistency group (CG1) of a primary storage site and one or more storage objects of a second consistency group (CG2) of a secondary storage site with at least one storage site having read/write access, initiating a peer health check to determine a health condition of the primary storage site and concurrently initiating a create snapshot process to create a snapshot of one or more storage volumes of the CG2 of the secondary storage site in response to detection of missing heartbeat communications from the primary storage site and a potential failover, performing inflight tracking replay and reconciliation between a first Op log of an active file system of the primary storage site and a second Op log that is based upon the recent snapshot of the secondary storage site, and performing a resynchronization process between the one or more storage objects of the CG1 and the one or more storage objects of the CG2 based upon a recent snapshot of the primary storage site and the recent snapshot of the secondary storage site.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 8A and 8B are a flow diagram illustrating a set of operations for performing an Op log based journaling (e.g., persistent inflight tracking replay and reconciliation) for fast resynchronization in accordance with an embodiment of the present disclosure.

DETAILED DESCRIPTION

Figure 1:
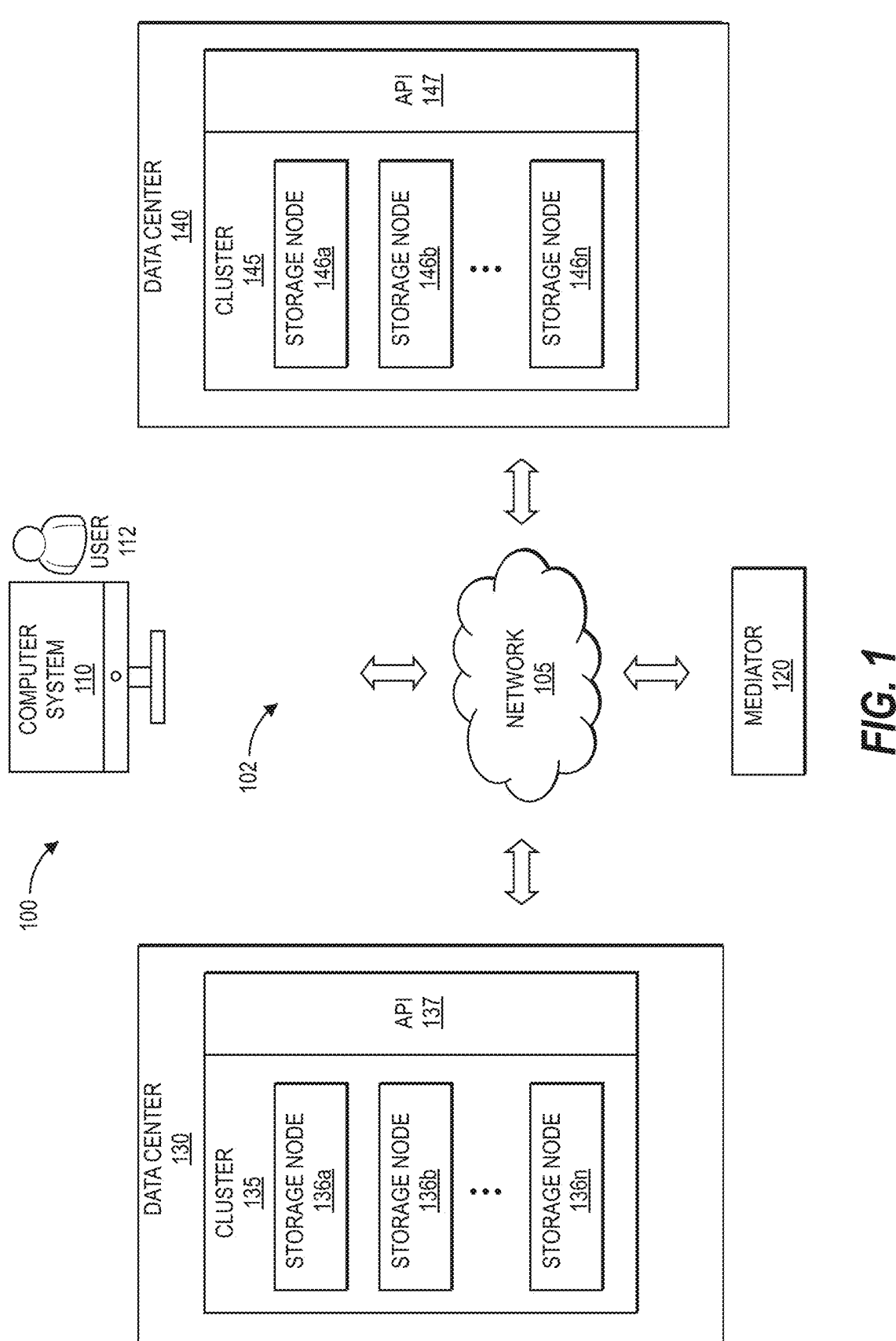
FIG. 1 is a block diagram illustrating an environment in which various embodiments may be implemented.

Systems and methods are described for efficient Op log based journaling to improve fast resynchronization within a cross-site distributed storage system to provide zero recovery point objective (RPO) protection. In the context of cross-site distributed storage system (including cross-site HA storage solutions that perform synchronous data replication to support zero RPO protection), a certain degree of consistency over time is maintained between a mirror copy and a primary dataset depending upon the particular implementation. A consistency group (CG) of a primary storage site having numerous data containers/volumes hosting the data at issue can have a continuity relationship with replicated storage objects of a CG of a secondary storage site. The CG of the primary storage site and the CG of secondary storage can become out of sync due to a failure event or network partition between the primary and secondary storage sites.

An automatic unplanned failover may occur if the primary storage site remains unreachable for more than a brief threshold duration (e.g., 5-20 seconds). After the primary storage site becomes available, a snapshot based resynchronization starts using a last common snapshot which potentially could be numerous hours old. It is possible that the primary storage site is unavailable for a short duration (e.g., 10 to 20 minutes) due to a failure event or network partition. Reverting data of the primary storage site to the common snapshot data from numerous hours ago and bringing back the data from secondary storage site is suboptimal, since the data collected from the last snapshot point from numerous hours ago (e.g., at 6 am) up to the failure event (e.g., at 2 pm) is discarded and then needs to be transferred again from the primary storage site to the secondary storage site.

The storage solution of the present design essentially uses the data up to a point where the storage system lost a Sync status between CG1 and CG2 and catches up on a lag from that point as part of fast resynchronization instead of resynchronizing from an older snapshot point of time.

In one example, a primary and a secondary storage cluster are diverged due to inflight I/O operations (ops) that are not yet acknowledged to a client device. An inflight op is an op that is in progress on either primary or secondary storage cluster and its response is held by a synchronous replication circuitry (SR circuitry), which includes a splitter component (or replicating component). An inflight Op can be a data Op (e.g., write, punch hole, etc.) or a metadata op (e.g., create, unlink, set attribute, etc.). An inflight Op can have the following states: request received: Op is received by splitter component primary sent: Op is in progress with file system of SR circuitry of primary storage cluster primary done: Op completed by file system of primary storage cluster and splitter component callback has been called.

secondary sent: Op is dispatched to secondary storage cluster and is either in transit (network) or in progress by file system of SR circuitry of secondary storage cluster.

secondary done: Op completed by file system of secondary storage cluster and splitter component has received a completion callback.

response sent: Op completed on both of primary and secondary storage cluster and a response is released by splitter component of SR circuitry.

A splitter component can include a queue to store incoming operations and a splitter object that is configured to split (replicate) operations targeting a storage object. The splitter object replicates the operations to a replicated storage object of the second storage cluster. Operations that been acknowledged to the client device have been executed by a storage cluster and hence committed on both primary and secondary endpoints for the primary and secondary storage clusters. However, at a given instance of time, one or more Ops could be in flight i.e., executed on neither of endpoints (e.g., first storage object hosted by primary storage cluster, replicated second storage object hosted by secondary storage cluster), both of the endpoints, or executed on one of the endpoints. As a consequence, the primary and second storage clusters at a given point in time could be divergent with respect to inflight Ops. A common snapshot may be performed periodically to serve as resynchronization points.

Data operations are designed with an idempotent property while metadata operations are designed with a non-idempotent property. To address this divergence, the present design when in a state of synchronous replication (in sync state) will persistently track inflight operations. Also, before opening up a storage object for I/O operations of a client device, the present design will replace the inflight operations prior to resuming synchronous replication.

Embodiments described herein seek to improve various technological processes associated with cross-site storage solutions and ensure the process of quickly establishing resynchronization between a storage object (e.g., a first storage object) of a primary storage cluster and a replicated storage object (e.g., a second storage object) of a secondary storage cluster. Various embodiments of the present technology provide for a wide range of technical effects, advantages, and/or improvements to stretched storage systems and participating distributed storage systems. For example, various embodiments may include one or more of the following technical effects, advantages, and/or improvements: (i) upon triggering detection of heartbeat misses and initiation of a peer health check for a primary storage site, start a snapshot process on a secondary storage site; (ii) if AUFO starts from the primary to secondary storage site due to the health check, then tag the snapshot as usable for reverse resync; (iii) upon the AUFO completing and the primary storage site becoming available, reconcile the Op logs in the primary and secondary storage site and then create snapshot on the primary storage site with same unique identifier as that of a reverse replay snapshot of the secondary storage site; and (iv) snapshot based resynchronization occurs using most recent snapshot from the secondary storage site.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST) ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
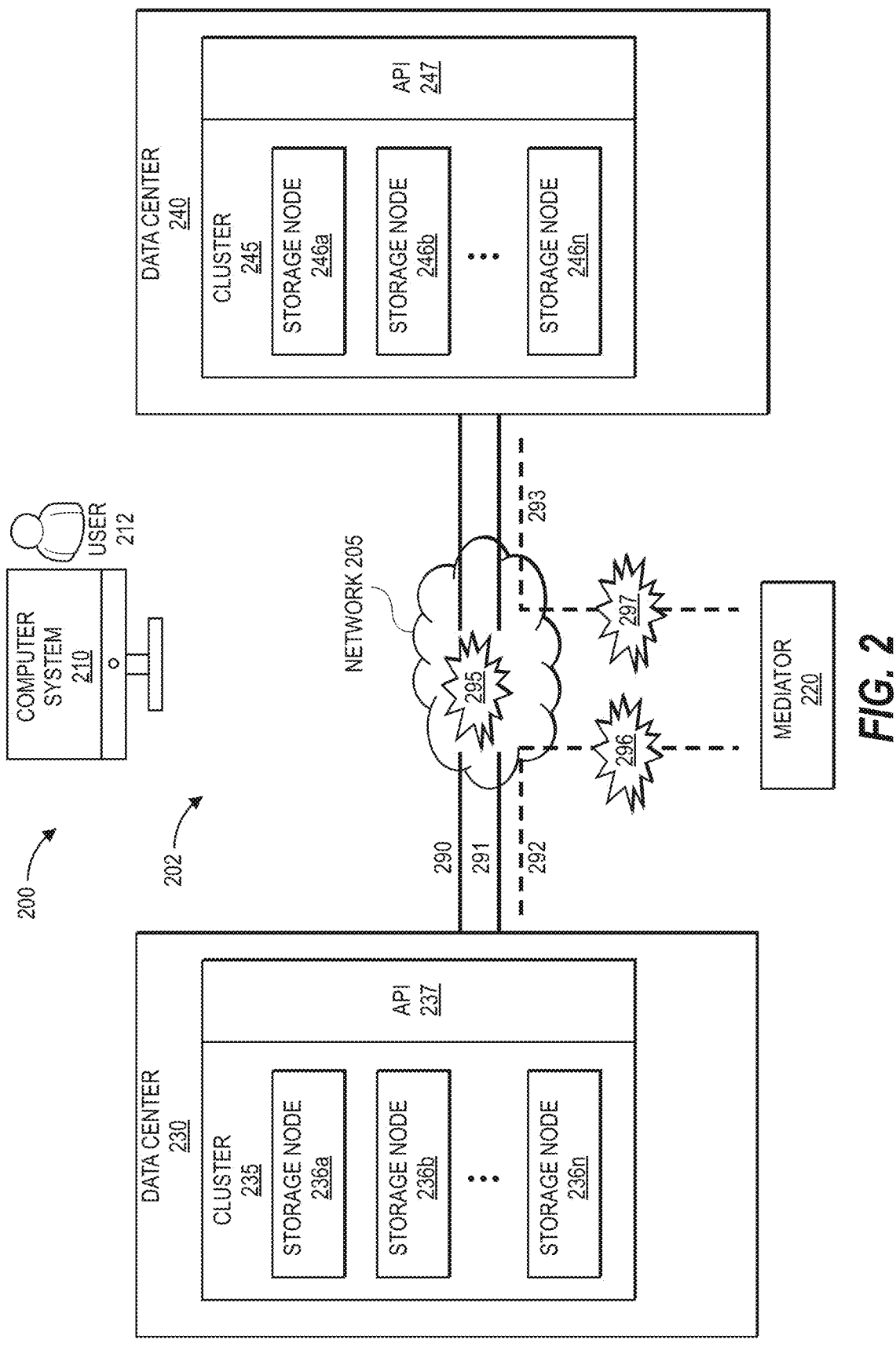
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
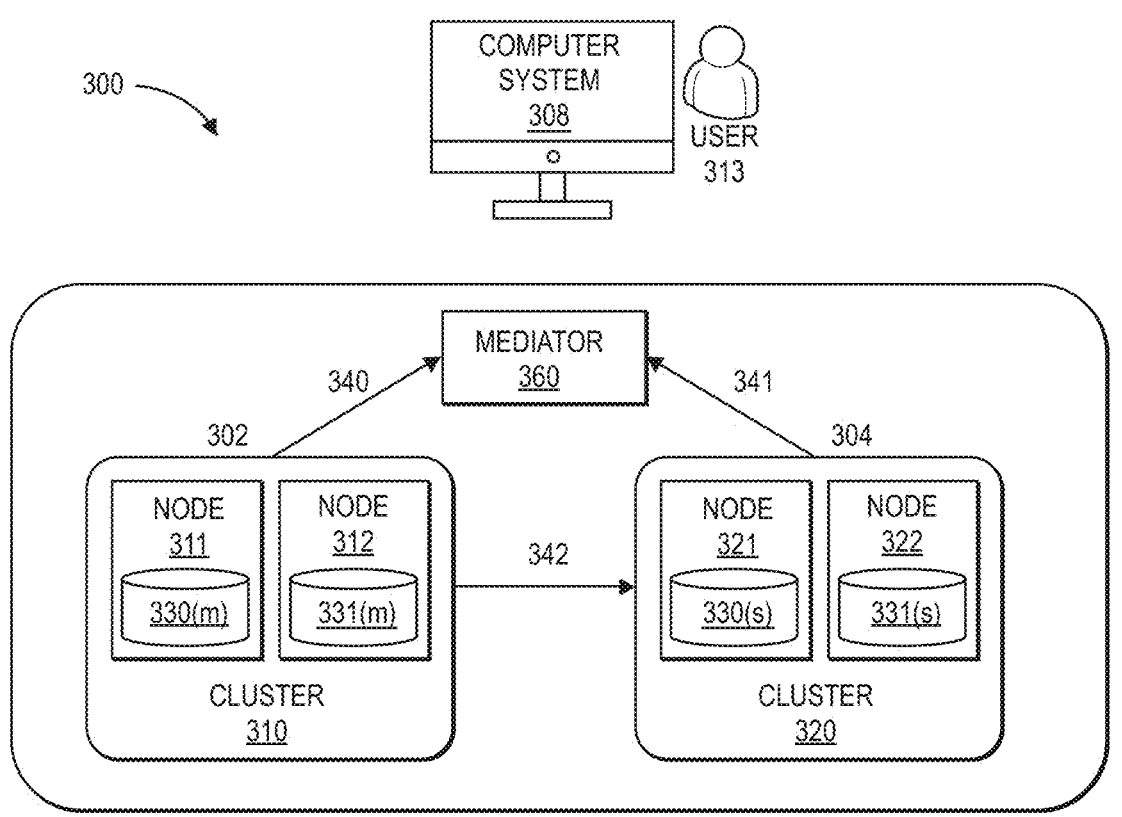
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 313) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet. The communications 340-342 provide redundance communication channels for operations of the distributed storage system 300 (e.g., liveliness operation, consensus operation)

The cluster 310 includes nodes 311 and 312 while the cluster 320 includes nodes 321 and 322. In one example, the cluster 320 has a data copy 330 in node 321 that is a mirrored copy of data copy 330 in node 311. A data copy 331 in node 322 is a mirrored copy of the data copy 331 in node 312 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the nodes 311 and 312 are designated as a master and the nodes 321 and 322 are designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

In one embodiment, node 311 has a failure and the data copy 331 for a storage object of node 312 remains in sync. The node 312 handles a takeover operation for data copy 330 (master). Upon a volume mount time, the node 311 temporarily disallows input/output operations (e.g., both read and write) with a retriable error. The I/O operations from a computer system 308 are not allowed at node 311 until resynchronization occurs or a timeout occurs.

Next, the cluster 320 performs an automatic Fast Resynchronization (Fast Resync) to maintain zero recovery point objective (RPO) protection. The Fast Resync is based on reestablishing a Sync Data Path between data copy 330 (master) of node 311 and data copy 330 (slave) of mirrored node 321, and reconciling inflight regions based on persistent inflight tracking of I/O operations (IFT-P). The secondary storage cluster 320 can be provided with necessary information about a high availability partner to avoid cross-cluster calls between the primary and secondary storage cluster. Note, no asynchronous transfers and transition are allowed during the Fast Resync, which will establish a transfer engine session and start persistent inflight op tracking replay. A Fast Resync can be triggered as soon a storage object on the secondary storage cluster is mounted.

Subsequently, node 311 waits for resumption of synchronous replication and allows I/O upon completion of the synchronous replication.

Figure 6A:
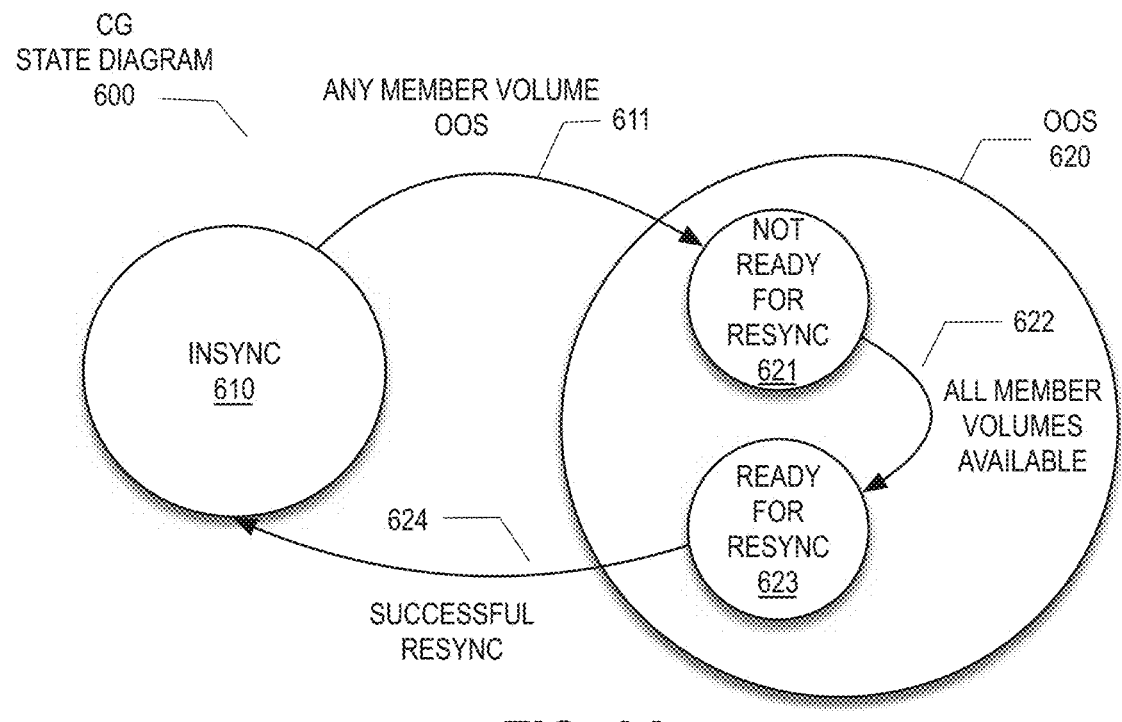
FIG. 6A is a CG state diagram in accordance with an embodiment of the present disclosure.
Figure 6B:
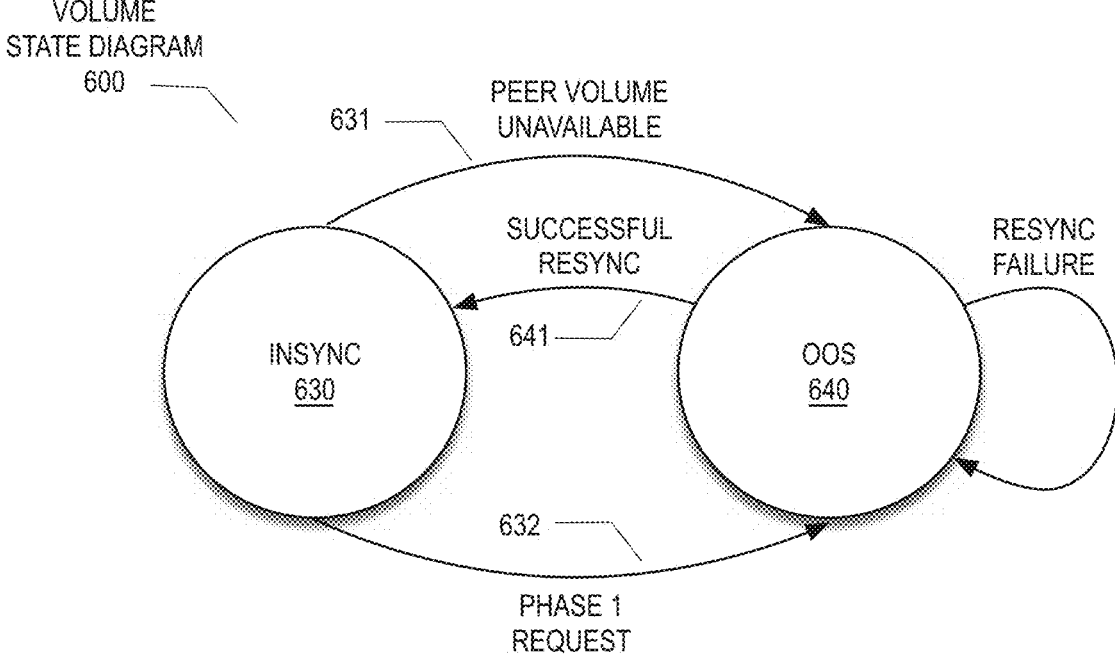
FIG. 6B is a volume state diagram in accordance with an embodiment of the present disclosure.

If Fast Resync experiences an error or failure resulting in the Fast Resync not being possible within a certain time period (e.g., 30-90 seconds, 60 seconds), then the following phases occur:

Phase 1: After expiration of the certain time period, node 311 will take a CG for node 311 out of sync (OOS). The state diagrams for the CG and a storage object (e.g., data container/volume) are illustrated in FIGS. 6A and 6B when Fast Resync has an error or failure.

Phase 2: add a strict sync policy to database software management that will disallow I/O for an extended time period or indefinite time period. Phase 1 behavior will be the default mode of operations if fast resync is not successfully performed within the certain time period.

The master and slave roles for the clusters 310 and 320 help to avoid a split-brain situation with both of the clusters simultaneously attempting to serve I/O commands. There are scenarios where both master and slave copies can claim to be a master copy. For example, a recovery post failover or failure during planned failover workflow can results in both clusters 310 and 320 attempting to serve I/O commands. In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as indicated by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
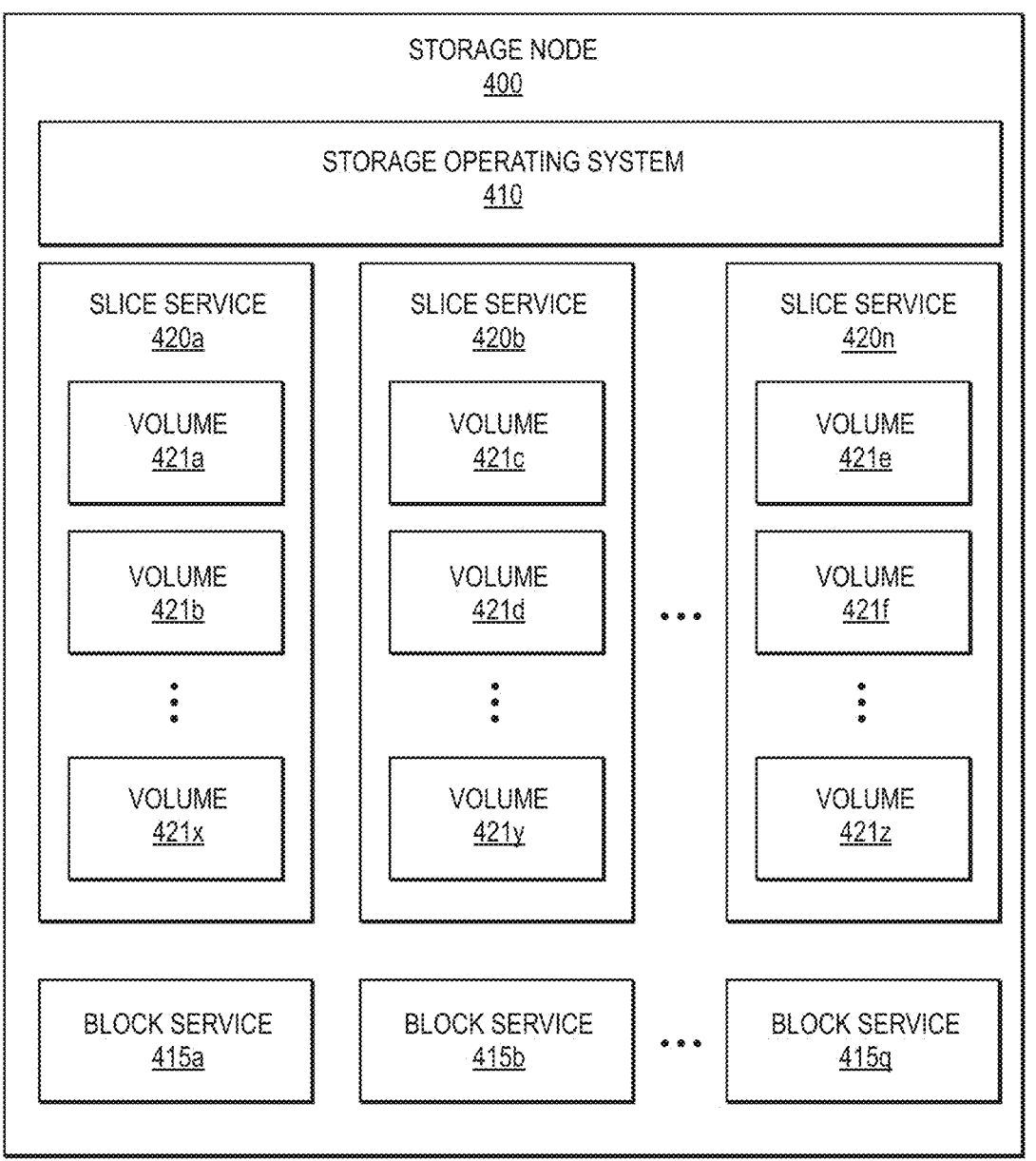
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 715, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
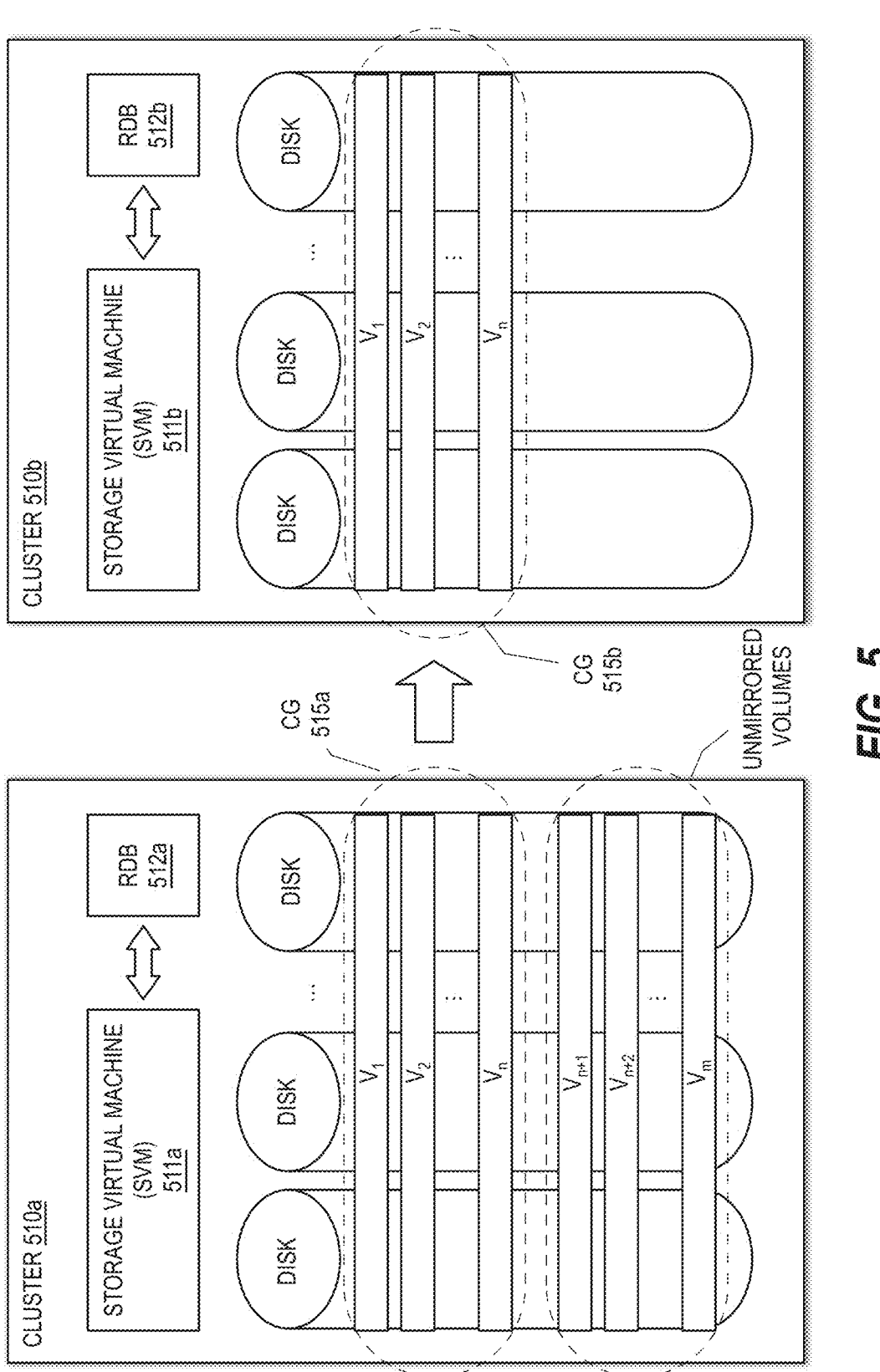
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110a and 110b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110a may be operable within a first site (e.g., a local data center) and cluster 110b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115a or CG 115b). A CG is a collection of storage objects or data containers (e.g., volumes) within a cluster that are managed by a Storage Virtual Machine (e.g., SVM 111a or SVM 111b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115a may be referred to as a local CG from the perspective of cluster 110a and as a remote CG from the perspective of cluster 110b. Similarly, CG 115a may be referred to as a remote CG from the perspective of cluster 110b and as a local CG from the perspective of cluster 110b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112a and 112b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 115a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary (master) cluster is stored on more than one secondary (slave) cluster.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 624 from the ready for resync state 623 to the InSync state.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 631 from the InSync state to the OOS state responsive to a peer volume being unavailable. A given volume may transition 64 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

Figure 7:
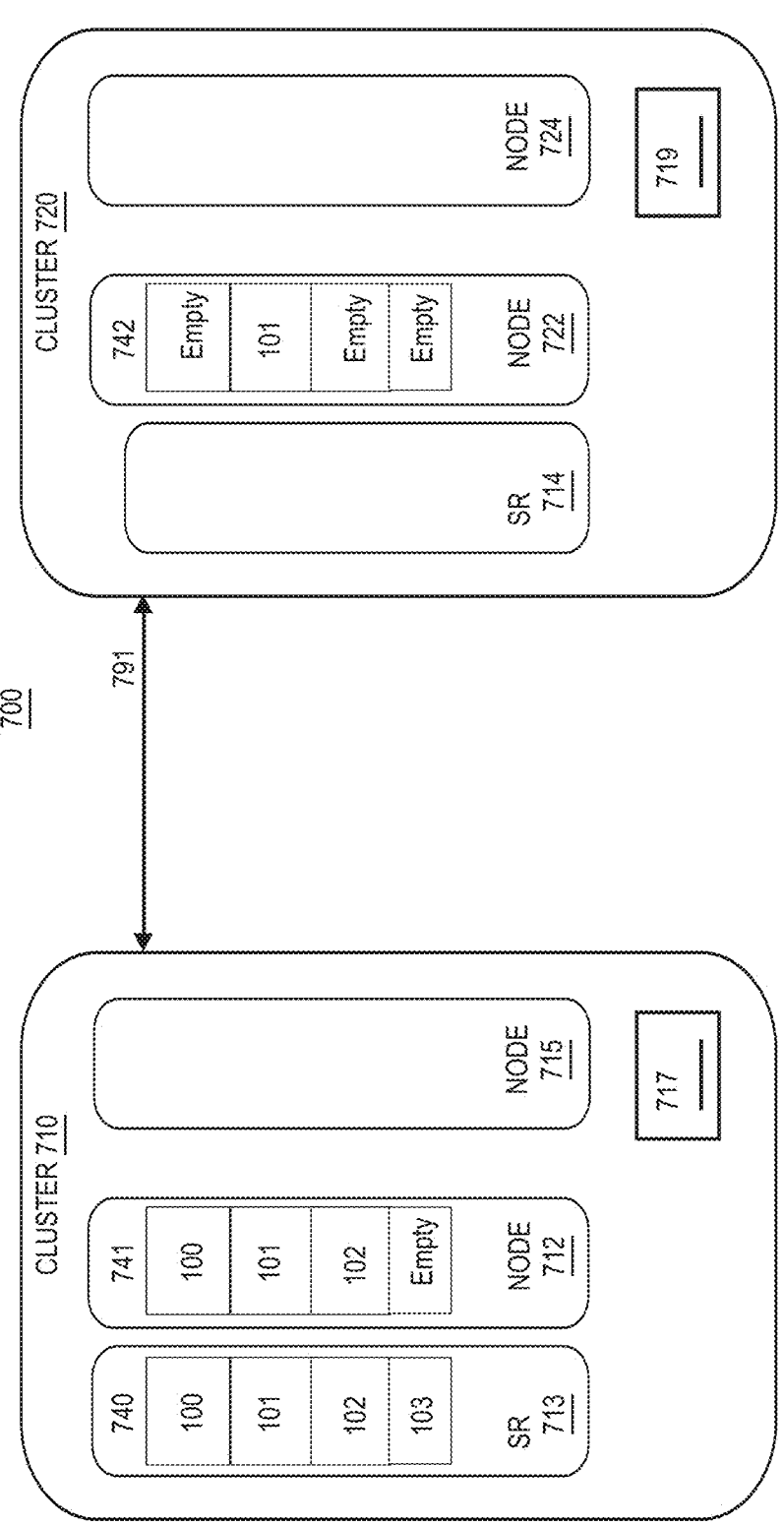
FIG. 7 is a block diagram illustrating a persistent inflight tracker that is implemented with operation (Op) logs in a distributed storage system in accordance with an embodiment of the present disclosure.

Early Initiation of a Snapshot on a Secondary Storage Site and Op Log Based Journaling for Fast Resynchronization FIG. 7 is a block diagram illustrating a persistent inflight tracker that is implemented with operation (Op) logs in a distributed storage system in accordance with an embodiment of the present disclosure. In one embodiment, the distributed storage system 700 includes a primary storage cluster 710 with a primary copy of data in a consistency group (CG) that may include a subset or all volumes or data containers of a storage node. The consistency group can include volumes of nodes 712 and 715. Initially, this CG can be assigned a primary role. The secondary storage cluster 720 has a mirror copy of the data in a consistency group that may include volumes of nodes 752 and 754. This CG can be initially assigned a secondary role.

Each storage cluster may include a configuration database (e.g., persistent replicated database (RDB) 717, 719, RDB 512a, RDB 512b,), which is available on all storage nodes of a storage cluster. Each storage cluster includes synchronization replication circuitry (SR circuitry) 713 and 714 for synchronous replication between the storage clusters.

The operation logs or journals synchronize across a filesystem from a primary storage cluster 710 having a primary copy of data and secondary storage cluster 720 having a mirror copy of the data. In the event of an Out of Sync state for a storage volume due to a failure event (e.g., network glitch, power outage, or a node crash, etc.), a mechanism is designed to protect data for the volume and its mirror copy, avoid a coordinated OOS state for other volumes within the same CG as the OOS volume, and also avoid an OOS notification from nodes of the secondary storage cluster acting as a secondary role to an external mediator.

Embodiments of the present disclosure provide an Op log 741 on primary copy of node 712 and another Op log 742 on the secondary copy of node 722. Both of the copies will specify which operations are committed on each of the sides of the storage clusters. These two copies can be used to find how the filesystems for each storage cluster are differing and carry out resynchronzation if necessary. Embodiments of the present disclosure eliminate design options that involve the synchronization replication circuitry (SR) components 713 and 714 directly accessing non-volatile memory contents.

In one example, persistent inflight tracking uses only In-Volume metafiles and has a minimal impact on the Op path length. A Write to metafile isn't logged in memory (e.g., non-volatile memory). Instead, a non-volatile log replay of the Op regenerates the entry in the metafile.

The SR circuitry 713 includes an active Ops log file 740 and can be implemented with a circular array. For each Op, the SR circuitry 713 specifies its view of an Inflight Op range <Head, Tail> in a message payload. Even though responses come out of order, the SR circuitry 713 waits for a head Op to be completed and frees up all consecutive Ops which are responded to next.

The various nodes (e.g., storage nodes 136a-n and storage node 400) of the distributed storage systems described herein, and the processing described below with reference to the flow diagrams of FIGS. 8A and 8B may be implemented in the form of executable instructions stored on a machine readable medium (e.g., computer-readable medium) and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as described with reference to FIGS. 10-12 below.

FIGS. 8A and 8B are a flow diagram illustrating a set of operations for performing an Op log based journaling (e.g., persistent inflight tracking replay and reconciliation) for fast resynchronization in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure event and have an OOS state (e.g., OOS 620) for a period of time. Depending upon the nature of the data replication being performed (e.g., asynchronous or synchronous) and the particular implementation, a resynchronization may be performed responsive to any volume having OOS state.

State information regarding a data replication status of a mirror copy of a dataset associated with a local CG may be maintained, for example, to facilitate automatic triggering of resynchronization. For example, the state information may include information relating to the current availability or unavailability of a peer volume of a local CG.

At operation 802, computer-implemented method 800 monitors heartbeat communications between the primary and secondary storage sites. At operation 804, upon detection of missing heartbeat communications from the primary storage site, the secondary storage site initiates a peer health check to determine a health condition of the primary storage site and this concurrently at a same time initiates a create snapshot process to create a snapshot of one or more storage volumes of the remote CG of the secondary storage site. The snapshot of the one or more storage volumes of the remote CG is capable of being used to reduce a time for transitioning from out of sync state to in sync state for synchronous replication between the local CG and the remote CG.

At operation 806, the snapshot being created is tagged with one or more tags, which indicate that the snapshot is intended for reverse inflight tracking replay and reconciliation from the secondary site to the primary site and isn't usable yet. A duration of the health check of the primary storage site is typically less than a time period needed for snapshot creation and thus provides ample time to complete the snapshot creation in parallel and allows the present storage solution to maintain existing input output resumption time (IORT) guarantees.

At operation 808, the computer-implemented method determines whether an automatic unplanned failover (AUFO) occurs based on a result of the health check process. For example, if the health check indicates that the primary storage site is unavailable, then this would trigger the failover from the primary storage site to the secondary storage site in which the secondary storage site would have a primary role for serving IO operations. In case of a false positive with no AUFO being initiated and the one or more tags of the snapshot indicating that the snapshot is not usable for resynchronization, then at operation 810 the computer-implemented method discards or deletes the snapshot created above for the remote CG. Also, if the snapshot creation takes beyond a stipulated time period for the health check, then the computer-implemented method discards or deletes the snapshot created above for the remote CG.

At operation 812, if the health check results in an AUFO action and the snapshot creation is complete, then the computer-implemented method tags the newly created snapshot for the secondary storage site as usable for reverse resync.

At operation 814, upon completion of the AUFO and later when the primary storage site becomes available, perform inflight Op replay and reconciliation between an Op log of the secondary storage site (e.g., Op log from snapshot on the secondary storage site) and an Op log generated by an active file system (AFS) on the primary storage site. Ops in the Op log of the secondary storage site can be replayed to the Op log of the primary storage site or vice versa for the reconciliation. This means for Ops in flight (i.e., not committed on one of the storage sites), apply data from the secondary storage site to the primary storage site. At operation 816, the computer-implemented method creates a snapshot on the primary storage site with a same version unique user identifier (UUID) as that of the snapshot created on the secondary storage site.

At operation 818, the computer-implemented method performs snapshot based resynchronization using the snapshot of the primary storage site from operation 816 and most recent snapshot from the secondary storage site rather than an older snapshot from the primary storage site that was potentially created numerous hours before the primary storage site became unavailable and unreachable.

Exceptions to reverse inflight tracking and replay of operation 814 include whether the primary storage site has one or more metadata Ops in flight. If so, then the method will not be able to undo the metadata Op on the primary storage site. Therefore, the inflight Op tracking and replay will be skipped if the primary storage site has one or more metadata Ops in flight which were not committed on the secondary storage site. In this case, a snapshot based resync occurs.

When a business continuity relationship between a local CG and a remote CG becomes out of sync (e.g., potential failover and OOS state at operation 804) and the inflight tracking and replay takes a longer duration, the present storage solution falls back to a snapshot based logical replication with storage efficiency (LRSE) resync. As mentioned above, resync using an old snapshot can be very inefficient. The above method can be deployed to perform a snapshot on the primary storage site before allowing user IO. This snapshot can be used to carry out the inflight Op tracking replay between the primary and secondary storage sites. A snapshot can be created after replay using Op logs from the primary storage site's snapshot and the secondary storage site's AFS. This snapshot can then be the common snapshot for further LRSE.

In one example, LRSE uses block-level metadata and knowledge of the file system to determine differences between snapshots at an indirect pointer level. LRSE organizes the transfer of data from the source to the destination in two streams. The data stream includes data blocks that are transferred with specific volume block number (vvbn #) within the destination volume. This vvbn #helps identify the block number at which the data is stored on the source Flex Vol volume, but without specifying a file context. On the destination, the data is written to the data warehouse (DW) file with a file block number (fbn #) which corresponds to the vvbn #. The user files are transferred by reference using the user file inodes, which share blocks with the data warehouse file and do not use buffer trees that require parsing to reach a specific object. LRSE makes explicit requests to the block-sharing infrastructure of the DW blocks (the donors) with user files (recipients) while replication transfer is in progress.

The computer-implemented method 800 is useful for all resynchronization processes even if no AUFO occurs from the primary storage site to the secondary storage site. For example, a network partition between the primary and secondary storage sites can cause the primary storage site to be unreachable from the secondary storage site. The above operations of method 800 apply to reduce a resynchronization time.

Figure 9:
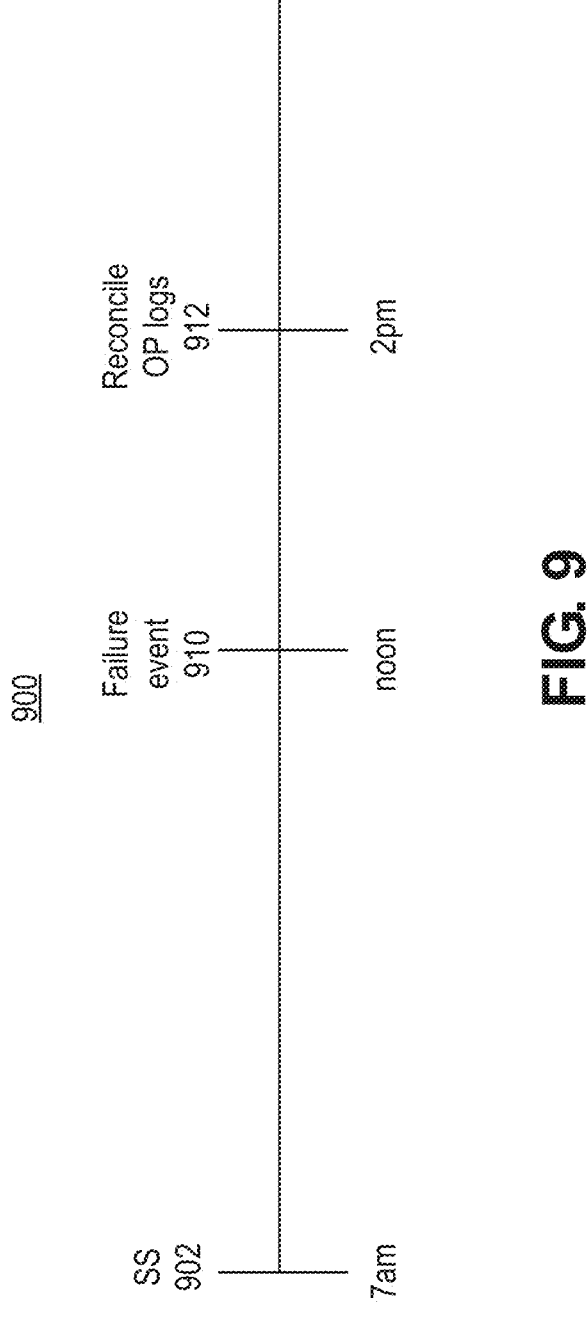
FIG. 9 illustrates a time line to show a set of operations for performing an Op log based journaling (e.g., persistent inflight tracking replay and reconciliation) for fast resynchronization in accordance with an embodiment of the present disclosure.

FIG. 9 illustrates a time line 900 to show a set of operations for performing an Op log based journaling (e.g., persistent inflight tracking replay and reconciliation) for fast resynchronization in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure event and have an OOS state (e.g., OOS 620) for a period of time. Depending upon the nature of the data replication being performed (e.g., asynchronous or synchronous) and the particular implementation, a resynchronization may be performed responsive to any volume having OOS state.

In one example, at 7 am, a snapshot is created on the primary storage site for operation 902. At noon, a failure event occurs and the primary storage site is unavailable and not reachable from the secondary storage site. At operation 910 (e.g., operations 802-812 of method 800), upon detection of missing heartbeat communications from the primary storage site, the secondary storage site initiates a peer health check to determine a health condition of the primary storage site and concurrently in parallel initiates a create snapshot process at noon to create a snapshot of one or more storage volumes of the remote CG of the secondary storage site. The result of the health check process may or may not result in an AUFO action. In case of a false positive for AUFO, the method discards the snapshot created above. If the snapshot creation takes beyond a stipulated time for the health check, the method aborts and discards the snapshot creation. If the health check results in an AUFO action and the snapshot creation is complete, then tag the snapshot mentioned in the secondary storage site as usable for reverse resync.

At operation 912 (e.g., operations 814-818), upon completion of the AUFO and later when the primary storage site becomes available, perform inflight Op replay and reconciliation between an Op log of the secondary storage site (e.g., Op log from snapshot on the secondary storage site) and an Op log generated by an active file system (AFS) on the primary storage site. Ops in the Op log of the secondary storage site can be replayed to the Op log of the primary storage site or vice versa for the reconciliation. The method creates a snapshot on the primary storage site with a same version unique user identifier (UUID) as that of the snapshot created on the secondary storage site. Then, the method performs snapshot based resynchronization using the most recent snapshot from the primary storage site and the most recent snapshot from the secondary storage site rather than an older snapshot from the primary storage site that was potentially created numerous hours (e.g., at 7 am) before the primary storage site became unavailable and unreachable at noon.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 10:
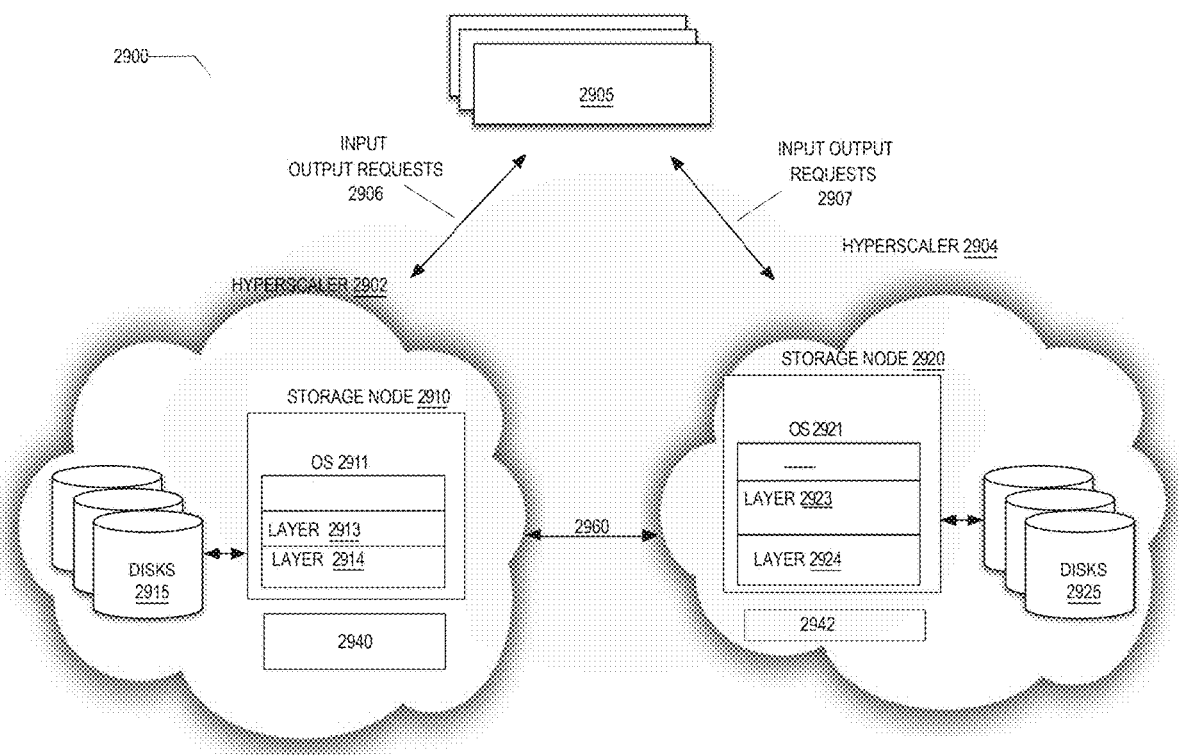
FIG. 10 is a block diagram illustrating a cloud environment in which various embodiments may be implemented (e.g., virtual storage nodes of a primary storage site, a secondary storage site, and a tertiary storage site).

FIG. 10 is a block diagram illustrating a cloud environment in which various embodiments may be implemented (e.g., virtual storage nodes of a primary storage site, a secondary storage site, and a tertiary storage site). In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having layers 2913 and 2914 of a protocol stack for processing of object storage protocol operations or requests.

The virtual storage node 2920 includes an operating system 2921, layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

Figure 11:
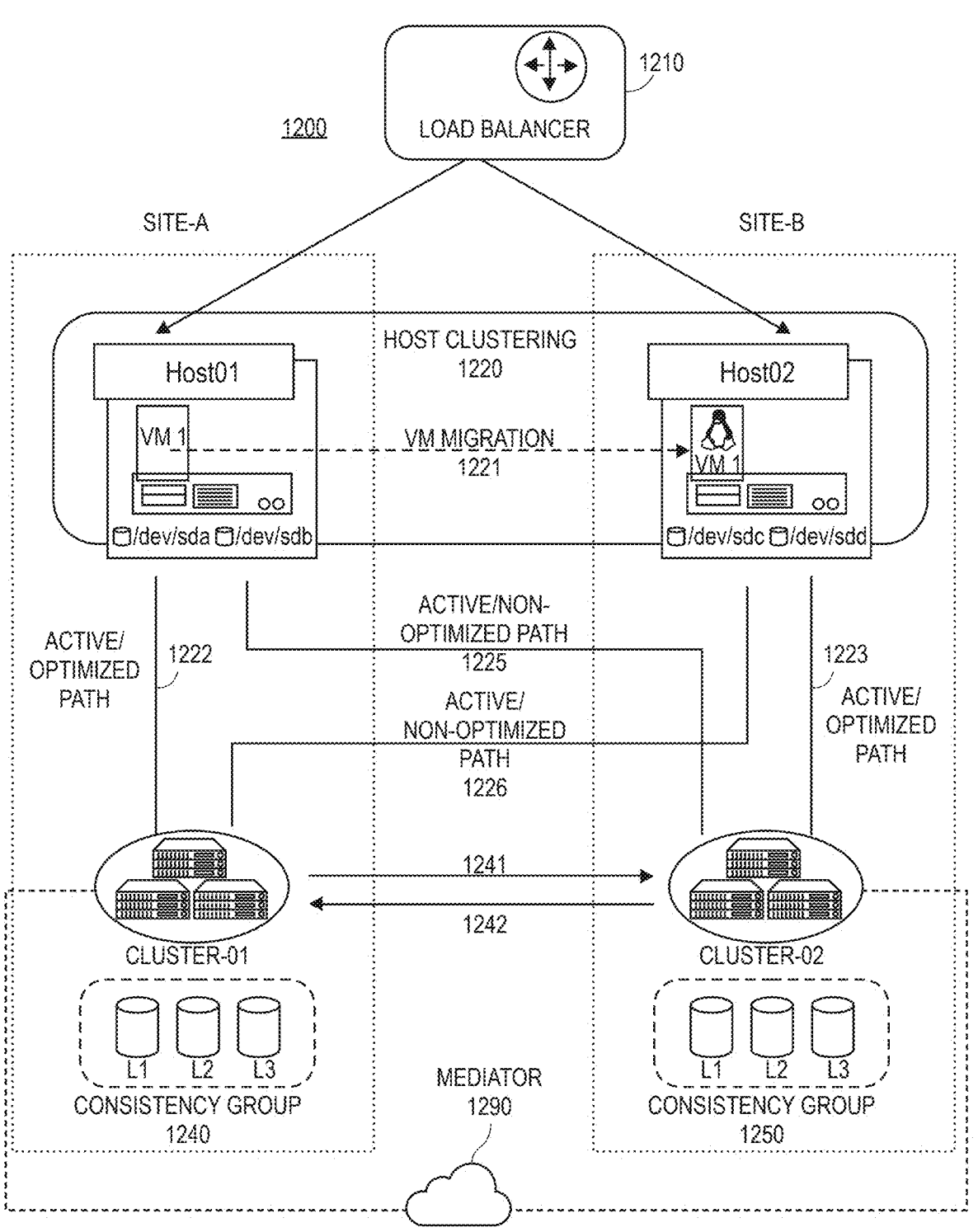
FIG. 11 is a block diagram illustrating a virtualized environment in which various embodiments may be implemented (e.g., virtual storage nodes of a primary storage site, a secondary storage site, etc.).

FIG. 11 is a block diagram illustrating a virtualized environment in which various embodiments may be implemented (e.g., virtual storage nodes of a primary storage site, a secondary storage site, etc.). In various examples described herein, a virtual storage system 1200 may be run (e.g., on a VM or as a containerized instance, as the case may be) within a public cloud provider. In the context of the present example, the virtual storage system 1200 includes a management server appliance 1210, a host clustering 1220 that includes host 01 and a host 02, and clusters 01 and 02.

Cluster 01 includes a consistency group 1240 with L1, L2, and L3. Cluster 02 includes a consistency group 1250 with L1, L2, and L3.

To create a virtualized high availability host clustering 1220 across two sites A and B, hosts are used and managed by a server appliance 1210. The virtual machine (VM-1) can be migrated 1221 from host 01 to host 02. The server appliance 1210 is a centralized management system that enables administrators to effectively operate hosts in host clusters. The server appliance 1210 facilitates key functions such as VM provisioning, High Availability (HA), Distributed Resource Scheduler (DRS), Kubernetes Grid, and more. It is an important component in cloud environments.

The virtual storage system 1200 provides advanced business continuity if one or more failure domains suffer a total outage. The virtual storage system 1200 may present storage over a network to clients using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients may request services of the virtual storage system 1200 by issuing Input/Output requests (e.g., file system protocol messages (in the form of packets) over the network). A representative client may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the clusters 01 and 02 each include virtual storage nodes with each virtual storage node including an operating system. The storage nodes can include storage device drivers for transmission of messages and data via the one or more links 1241 and 1242.

The data served by the virtual storage nodes may be distributed across multiple storage units embodied as persistent storage devices (e.g., non-volatile memory), including but not limited to HDDs, SSDs, flash memory systems, or other storage devices.

The clusters 01 and 02 enable business services to continue operating even through a complete site failure, supporting applications to fail over transparently using a secondary copy. Neither manual intervention nor custom scripting are required to trigger a failover with active sync. The active sync supports a symmetric active active capability, enabling read and write I/O operations from both copies of a protected LUN (e.g., L1, L2, L3) with bidirectional synchronous replication, enabling both LUN copies to serve I/O operations locally.

A data protection relationship to protect for business continuity is created between the source storage system (e.g., cluster 01) and destination storage system (e.g., cluster 02), by adding the application specific LUNs from different volumes within a storage virtual machine (SVM) to the consistency group. Under normal operations, the enterprise application writes to the primary consistency group (e.g., CG 1240), which synchronously replicates this I/O to the mirror consistency group (e.g., CG 1250). Even though two separate copies of the data exist in the data protection relationship, because active sync maintains the same LUN identity, the application host sees this as a shared virtual device with multiple paths (e.g., active/optimized paths 1222, 1223; active/non-optimized path 1225, 1226) while only one LUN copy is being written to at a time. Active Optimized paths are a path state in ALUA (Asymmetric Logical Unit Access) where the target storage system responds to I/O requests using the most efficient path. In this case, the active/optimized path 1222 is between host 01 and cluster 01 at site A while the active/optimized path 1223 is between host 02 and cluster 02 at site B. The active non-optimized paths 1225 and 1226 are between different sites. This results in higher performance and reduced latency.

When a failure renders the primary storage system offline, the operating system detects this failure and uses the Mediator 1290 for reconfirmation. If neither the operating system nor the Mediator 1290 are able to ping the primary site with cluster 01, the operating system performs the automatic failover operation. This process results in failing over only a specific application without the need for the manual intervention or scripting which was previously required for the purpose of failover.

The external Mediator 1290 is external from sites A and B and installed in a third failure domain, distinct from the two distinct failure domains of the clusters 01 and 02. The Mediator 1290 acts as a passive witness to active sync copies. In the event of a network partition or unavailability of one copy, active sync uses Mediator 1290 to determine which copy continues to serve I/O, while discontinuing I/O on the other copy. The Mediator 1290 plays a crucial role in active sync configurations as a passive quorum witness, ensuring quorum maintenance and facilitating data access during failures. It acts as a ping proxy for controllers to determine liveliness of peer controllers. Although the Mediator does not actively trigger switchover operations, it provides a vital function by allowing the surviving node to check its partner's status during network communication issues. In its role as a quorum witness, the Mediator provides an alternate path (effectively serving as a proxy) to the peer cluster.

Furthermore, the Mediator allows clusters to get this information as part of the quorum process. The Mediator 1290 utilizes the node management LIF and cluster management LIF for communication purposes. The Mediator 1290 establishes redundant connections through multiple paths to differentiate between site failure and InterSwitch Link (ISL) failure. When a cluster loses connection with the Mediator software and all its nodes due to an event, it is considered not reachable. This triggers an alert and enables automated failover to the mirror Consistency Group (CG) in the secondary site, ensuring uninterrupted I/O for the client. The replication data path relies on a heartbeat mechanism, and if a network glitch or event persists beyond a certain period, it can result in heartbeat failures, causing the relationship to go out-of-sync. However, the presence of redundant paths, such as LIF failover to another port, can sustain the heartbeat and prevent such disruptions.

Figure 12:
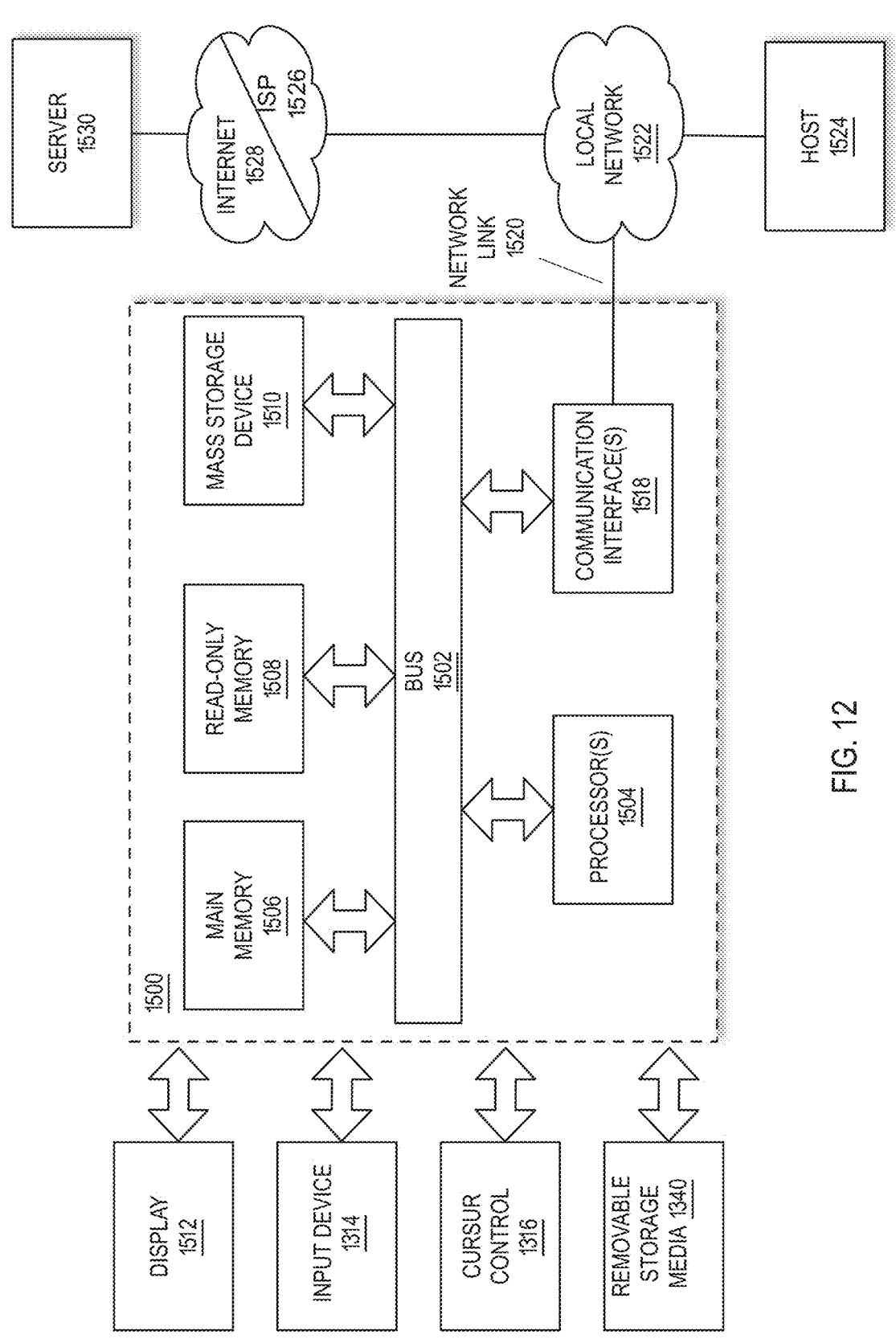
FIG. 12 illustrates an example computer system in which or with which embodiments of the present disclosure may be utilized.

FIG. 12 is a block diagram that illustrates a computer system 1500 in which or with which an embodiment of the present disclosure may be implemented. Computer system 1500 may be representative of all or a portion of the computing resources associated with a node (e.g., storage nodes 136*a-n* or storage nodes 146*a-n*) of a distributed storage system (e.g., cluster 235 or 245) or an administrative workstation (e.g., computer system 110 or 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., a hardware processor 1504) coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1118. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Some embodiments relate to Example 1 that includes a computer-implemented method performed by one or more processing resources of a distributed storage system. The computer-implemented method comprises establishing synchronous replication between one or more storage objects of a first consistency group (CG1) of a primary storage site and one or more storage objects of a second consistency group (CG2) of a secondary storage site with at least one storage site having read/write access, and initiating a peer health check to determine a health condition of the primary storage site and concurrently initiating a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

Example 2 includes the subject matter of Example 1, the computer-implemented method further comprises monitoring heartbeat communications between the primary and secondary storage sites.

Example 3 includes the subject matter of any of Examples 1-2, wherein the snapshot being created is tagged with one or more tags, which indicate that the snapshot is intended for reverse inflight tracking replay and reconciliation from the secondary storage site to the primary storage site.

Example 4 includes the subject matter of any of Examples 1-3, the computer-implemented method further comprises adding one or more tags to the snapshot of the one or more storage objects of the CG2 of the secondary storage site, determining whether an automatic unplanned failover (AUFO) occurs based on a result of the health check process, performing inflight tracking replay and reconciliation between a first Op log of an active file system of the primary storage site and a second Op log that is based upon the snapshot of the secondary storage site if an automatic unplanned failover (AUFO) occurs based on a result of the health check process, creating a snapshot on the primary storage site with a same version identifier as that of the snapshot created on the secondary storage site, and performing a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

Example 5 includes the subject matter of any of Examples 1-4, the computer-implemented method further comprises discarding or deleting the snapshot created for the CG2 in case of a false positive with no AUFO being initiated and the one or more tags of the snapshot of the secondary storage site indicating not usable for resynchronization or if the create snapshot process takes beyond a stipulated time period for the health check.

Example 6 includes the subject matter of any of Examples 1-5, the computer-implemented method further comprises upon the health check resulting in an AUFO action and the create snapshot process is complete, tagging the snapshot from the snapshot creation for the secondary storage site as usable for reverse resynchronization.

Example 7 includes the subject matter of any of Examples 1-6, wherein the inflight tracking replay and reconciliation is performed upon the completion of the AUFO and when the primary storage site becomes available.

Some embodiments relate to Example 8 that includes a non-transitory computer-readable storage medium embodying a set of instructions, which when executed by one or more processing resources of a multi-site distributed storage system cause the one or more processing resources to establish synchronous replication between one or more storage objects of a first consistency group (CG1) of a primary storage site and one or more storage objects of a second consistency group (CG2) of a secondary storage site with at least one storage site having read/write access and initiate a peer health check to determine a health condition of the primary storage site and concurrently initiate a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

Example 9 includes the subject matter of Example 8, wherein the instructions when executed by the one or more processing resources cause the one or more processing resources to monitor heartbeat communications between the primary and secondary storage sites.

Example 10 includes the subject matter of any of Examples 8-9, wherein the snapshot being created is tagged with one or more tags, which indicates that the snapshot is intended for reverse inflight tracking replay and reconciliation from the secondary storage site to the primary storage site.

Example 11 includes the subject matter of any of Examples 8-10, wherein the instructions when executed by the one or more processing resources cause the one or more processing resources to add one or more tags to the snapshot of the one or more storage objects of the CG2 of the secondary storage site, determine whether an automatic unplanned failover (AUFO) occurs based on a result of the health check process, perform inflight tracking replay and reconciliation between a first Op log of an active file system of the primary storage site and a second Op log that is based upon the snapshot of the secondary storage site if an automatic unplanned failover (AUFO) occurs based on a result of the health check process, create a snapshot on the primary storage site with a same version identifier as that of the snapshot created on the secondary storage site, and perform a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

Example 12 includes the subject matter of any of Examples 8-11, wherein the instructions when executed by the one or more processing resources cause the one or more processing resources to discard or delete the snapshot created for the CG2 in case of a false positive with no AUFO being initiated and the one or more tags of the snapshot of the CG2 indicating not usable for resynchronization or if the create snapshot process takes beyond a stipulated time period for the health check.

Example 13 includes the subject matter of any of Examples 8-12, wherein the instructions when executed by the one or more processing resources cause the one or more processing resources to upon the health check resulting in an AUFO action and the create snapshot process is complete, tag the snapshot from the snapshot creation for the secondary storage site as usable for reverse resynchronization.

Example 14 includes the subject matter of any of Examples 8-13, wherein the inflight tracking replay and reconciliation is performed upon the completion of the AUFO and when the primary storage site becomes available.

Some embodiments relate to Example 15 that includes a multi-site distributed storage system having a primary storage site with a primary storage cluster and a secondary storage site with a secondary storage cluster, comprising one or more processing resources, and a non-transitory computer-readable medium coupled to the one or more processing resources, having stored therein instructions, which when executed by the one or more processing resources cause the one or more processing resources to establish synchronous replication between one or more storage objects of a first consistency group (CG1) of a primary storage site and one or more storage objects of a second consistency group (CG2) of a secondary storage site with at least one storage site having read/write access, and initiate a peer health check to determine a health condition of the primary storage site and concurrently initiate a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

Example 16 includes the subject matter of Example 15, wherein the instructions when executed by the one or more processing resources cause the one or more processing resources to monitor heartbeat communications between the primary and secondary storage sites.

Example 17 includes the subject matter of any of Examples 15-16, wherein the snapshot being created is tagged with one or more tags, which indicates that the snapshot is intended for reverse inflight tracking replay and reconciliation from the secondary storage site to the primary storage site.

Example 18 includes the subject matter of any of Examples 15-17, wherein the instructions when executed by the one or more processing resources cause the one or more processing resources to add one or more tags to the snapshot of the one or more storage objects of the CG2 of the secondary storage site, determine whether an automatic unplanned failover (AUFO) occurs based on a result of the health check process, perform inflight tracking replay and reconciliation between a first Op log of an active file system of the primary storage site and a second Op log that is based upon the snapshot of the secondary storage site if an automatic unplanned failover (AUFO) occurs based on a result of the health check process, create a snapshot on the primary storage site with a same version identifier as that of the snapshot created on the secondary storage site, and perform a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

Example 19 includes the subject matter of any of Examples 15-18, wherein the instructions when executed by the one or more processing resources cause the one or more processing resources to discard or delete the snapshot created for the CG2 in case of a false positive with no AUFO being initiated and the one or more tags of the snapshot indicating not usable for resynchronization or if the snapshot creation takes beyond a stipulated time period for the health check.

Example 20 includes the subject matter of any of Examples 15-18, wherein the instructions when executed by the one or more processing resources cause the one or more processing resources to upon the health check resulting in an AUFO action and the snapshot creation is complete, tag the snapshot from the create snapshot process for the secondary storage site as usable for reverse resynchronization.

What is claimed is:

1. A computer-implemented method performed by one or more processing resources of a distributed storage system, the computer-implemented method comprising:

establishing synchronous replication between one or more storage objects of a first consistency group (CG1) of a primary storage site and one or more storage objects of a second consistency group (CG2) of a secondary storage site with at least one storage site having read/write access; and initiating a peer health check to determine a health condition of the primary storage site and concurrently initiating a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

2. The computer-implemented method of claim 1, further comprises:

monitoring heartbeat communications between the primary and secondary storage sites.

3. The computer-implemented method of claim 1, wherein the snapshot being created is tagged with one or more tags, which indicate that the snapshot is intended for reverse inflight tracking replay and reconciliation from the secondary storage site to the primary storage site.

4. The computer-implemented method of claim 1, further comprises:

adding one or more tags to the snapshot of the one or more storage objects of the CG2 of the secondary storage site;

determining whether an automatic unplanned failover (AUFO) occurs based on a result of the health check process;

performing inflight tracking replay and reconciliation between a first Op log of an active file system of the primary storage site and a second Op log that is based upon the snapshot of the secondary storage site if an automatic unplanned failover (AUFO) occurs based on a result of the health check process;

creating a snapshot on the primary storage site with a same version identifier as that of the snapshot created on the secondary storage site; and performing a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

5. The computer-implemented method of claim 4, further comprises:

discarding or deleting the snapshot created for the CG2 in case of a false positive with no AUFO being initiated and the one or more tags of the snapshot of the secondary storage site indicating not usable for resynchronization or if the create snapshot process takes beyond a stipulated time period for the health check.

6. The computer-implemented method of claim 4, further comprises:

upon the health check resulting in an AUFO action and the create snapshot process is complete, tagging the snapshot from the snapshot creation for the secondary storage site as usable for reverse resynchronization.

7. The computer-implemented method of claim 4, wherein the inflight tracking replay and reconciliation is performed upon the completion of the AUFO and when the primary storage site becomes available.

8. A non-transitory computer-readable storage medium embodying a set of instructions, which when executed by one or more processing resources of a multi-site distributed storage system cause the one or more processing resources to:

establish synchronous replication between one or more storage objects of a first consistency group (CG1) of a primary storage site and one or more storage objects of a second consistency group (CG2) of a secondary storage site with at least one storage site having read/write access; and initiate a peer health check to determine a health condition of the primary storage site and concurrently initiate a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

9. The non-transitory computer-readable storage medium of claim 8, wherein the instructions when executed by the one or more processing resources cause the one or more processing resources to:

monitor heartbeat communications between the primary and secondary storage sites.

10. The non-transitory computer-readable storage medium of claim 8, wherein the snapshot being created is tagged with one or more tags, which indicates that the snapshot is intended for reverse inflight tracking replay and reconciliation from the secondary storage site to the primary storage site.

11. The non-transitory computer-readable storage medium of claim 8, wherein the instructions when executed by the one or more processing resources cause the one or more processing resources to:

add one or more tags to the snapshot of the one or more storage objects of the CG2 of the secondary storage site;

determine whether an automatic unplanned failover (AUFO) occurs based on a result of the health check process;

perform inflight tracking replay and reconciliation between a first Op log of an active file system of the primary storage site and a second Op log that is based upon the snapshot of the secondary storage site if an automatic unplanned failover (AUFO) occurs based on a result of the health check process;

create a snapshot on the primary storage site with a same version identifier as that of the snapshot created on the secondary storage site; and performing a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

12. The non-transitory computer-readable storage medium of claim 11, wherein the instructions when executed by the one or more processing resources cause the one or more processing resources to:

discard or delete the snapshot created for the CG2 in case of a false positive with no AUFO being initiated and the one or more tags of the snapshot of the CG2 indicating not usable for resynchronization or if the create snapshot process takes beyond a stipulated time period for the health check.

13. The non-transitory computer-readable storage medium of claim 11, wherein the instructions when executed by the one or more processing resources cause the one or more processing resources to:

upon the health check resulting in an AUFO action and the create snapshot process is complete, tag the snapshot from the snapshot creation for the secondary storage site as usable for reverse resynchronization.

14. The non-transitory computer-readable storage medium of claim 11, wherein the inflight tracking replay and reconciliation is performed upon the completion of the AUFO and when the primary storage site becomes available.

15. A multi-site distributed storage system having a primary storage site with a primary storage cluster and a secondary storage site with a secondary storage cluster, comprising:

one or more processing resources; and a non-transitory computer-readable medium coupled to the one or more processing resources, having stored therein instructions, which when executed by the one or more processing resources cause the one or more processing resources to:

establish synchronous replication between one or more storage objects of a first consistency group (CG1) of a primary storage site and one or more storage objects of a second consistency group (CG2) of a secondary storage site with at least one storage site having read/write access; and initiate a peer health check to determine a health condition of the primary storage site and concurrently initiate a create snapshot process to create a snapshot of one or more storage objects of the CG2 of the secondary storage site in response to detection of missing heartbeat communications from the primary storage site, wherein the snapshot of the one or more storage objects of the CG2 is utilized to reduce a time for transitioning from out of sync state to in sync state when the out of sync state occurs between the one or more storage objects of CG1 and the one or more storage objects of CG2.

16. The multi-site distributed storage system of claim 15, wherein the instructions when executed by the one or more processing resources cause the one or more processing resources to:

monitor heartbeat communications between the primary and secondary storage sites.

17. The multi-site distributed storage system of claim 15, wherein the snapshot being created is tagged with one or more tags, which indicates that the snapshot is intended for reverse inflight tracking replay and reconciliation from the secondary storage site to the primary storage site.

18. The multi-site distributed storage system of claim 15, wherein the instructions when executed by the one or more processing resources cause the one or more processing resources to:

add one or more tags to the snapshot of the one or more storage objects of the CG2 of the secondary storage site;

determine whether an automatic unplanned failover (AUFO) occurs based on a result of the health check process;

perform inflight tracking replay and reconciliation between a first Op log of an active file system of the primary storage site and a second Op log that is based upon the snapshot of the secondary storage site if an automatic unplanned failover (AUFO) occurs based on a result of the health check process;

create a snapshot on the primary storage site with a same version identifier as that of the snapshot created on the secondary storage site; and performing a resynchronization process between the one or more storage objects of the CG1 and the one or more storage objects of the CG2 based upon the snapshot of the primary storage site and the snapshot of the secondary storage site, which is available for the resynchronization process based on removal of the one or more tags from the snapshot of the secondary storage site.

19. The multi-site distributed storage system of claim 18, wherein the instructions when executed by the one or more processing resources cause the one or more processing resources to:

discard or delete the snapshot created for the CG2 in case of a false positive with no AUFO being initiated and the one or more tags of the snapshot indicating not usable for resynchronization or if the snapshot creation takes beyond a stipulated time period for the health check.

20. The multi-site distributed storage system of claim 18, wherein the instructions when executed by the one or more processing resources cause the one or more processing resources to:

upon the health check resulting in an AUFO action and the snapshot creation is complete, tag the snapshot from the create snapshot process for the secondary storage site as usable for reverse resynchronization.

\*  \*  \*  \*  \*